United States Patent [19]

Smutny

[11] Patent Number: 5,049,630

[45] Date of Patent: Sep. 17, 1991

[54] BLENDS OF POLYKETONES AND ACIDIC POLYMERS STABILIZED WITH SALTS

[75] Inventor: Edgar J. Smutny, Houston, Tex.

[73] Assignee: Shell Oil Company, Houston, Tex.

[21] Appl. No.: 471,465

[22] Filed: Jan. 29, 1990

[51] Int. Cl.$^5$ ................................................ C08K 5/09
[52] U.S. Cl. .................................... 525/539; 524/396; 524/398; 524/399; 524/400; 525/185; 525/919
[58] Field of Search ............... 524/396, 398, 399, 400; 525/539, 185, 919

[56] References Cited

U.S. PATENT DOCUMENTS

| | | | |
|---|---|---|---|
| 3,694,412 | 9/1972 | Nozaki | 260/63 CQ |
| 4,493,923 | 1/1985 | McCullough, Jr. | 525/211 |
| 4,859,539 | 8/1989 | Tomko et al. | 428/512 |
| 4,870,133 | 9/1989 | Lutz et al. | 525/185 |
| 4,874,819 | 10/1989 | George et al. | 524/502 |

FOREIGN PATENT DOCUMENTS

| | | |
|---|---|---|
| 121965 | 10/1984 | European Pat. Off. |
| 181014 | 5/1986 | European Pat. Off. |
| 213671 | 3/1987 | European Pat. Off. |
| 257663 | 3/1988 | European Pat. Off. |

*Primary Examiner*—Melvyn I. Marquis
*Assistant Examiner*—Thomas Hamilton, III
*Attorney, Agent, or Firm*—James O. Okorafor

[57] ABSTRACT

Thermoplastic polymer compositions of improved melt stability comprise a linear alternating polymer of carbon monoxide and at least one ethylenically unsaturated hydrocarbon, a partially zinc-neutralized acidic polymer containing moieties of an α-olefin and an α, β-ethylenically unsaturated carboxylic acid and metal salt wherein the metal is aluminum, magnesium or scandium.

17 Claims, No Drawings

BLENDS OF POLYKETONES AND ACIDIC POLYMERS STABILIZED WITH SALTS

FIELD OF THE INVENTION

This invention relates to stabilized compositions comprising linear alternating polymer of carbon monoxide and at least one ethylenically unsaturated hydrocarbon. More particularly, the invention relates to compositions of linear alternating polymer, a partial zinc salt of an acidic polymer containing moieties of an α-olefin and an α,β-ethylenically unsaturated carboxylic acid and a metal salt wherein the metal is aluminum, magnesium or scandium.

BACKGROUND OF THE INVENTION

The class of polymers of carbon monoxide and olefin(s) has been known for a number of years. Brubaker, U.S. Pat. No. 2,495,286, produced such polymers of relatively low carbon monoxide content in the presence of free radical initiators, e.g., peroxy compounds. U.K. 1,081,304 produced similar polymers of higher carbon monoxide content in the presence of alkylphosphine complexes of palladium salts as catalyst. Nozaki extended the process to produce linear alternating polymers in the presence of arylphosphine complexes of palladium moieties and certain inert solvents. See, for example, U.S. Pat. No. 3,694,412.

More recently, the class of linear alternating polymers of carbon monoxide and at least one ethylenically unsaturated hydrocarbon has become of greater interest in part because of the greater availability of the polymers. These polymers, often referred to as polyketones or polyketone polymers, have been more recently produced by processes illustrated by a number of published European Patent Applications including 121,965, 181,014, 213,671 and 257,663. The process typically involves the use of a catalyst composition formed from a compound of palladium, cobalt or nickel, the anion of a strong non-hydrohalogenic acid having a pKa below 2 and a bidentate ligand of phosphorus, arsenic or antimony.

The resulting polymers are relatively high molecular weight materials having established utility as premium thermoplastics in the production of shaped articles such as containers for food and drink by procedures which are conventional for thermoplastic polymers. Although the linear alternating polymers are crystalline with well defined melting points, the polymers do tend to lose crystallinity to some extent when exposed to multiple cycles of melting and solidification (crystallization). This apparent loss of crystallinity results in decreases in certain of the desirable properties of the polymers. It would be of advantage to provide compositions of the linear alternating polymers which have been stabilized against such apparent loss of crystallinity and accordingly have a higher melt stability.

Incorporation of one of the components of the compositions of the invention, the partial zinc salt of the acidic polymer, in linear alternating polymers is known from copending U.S. patent application Ser. No. 338,701, filed Apr. 17, 1989. The polymer blends thus produced are said to have improved processability and impact resistance.

SUMMARY OF THE INVENTION

The present invention provides compositions of linear alternating polymer and at least one ethylenically unsaturated hydrocarbon which are stabilized against undue loss of crystallinity upon repeated melting/crystallization cycles. More particularly, the invention provides such compositions which comprise a major proportion of linear alternating polymer, and minor amounts of a partial non-alkali metal salt of an acidic polymer containing moieties of an α-olefin and an α,β-ethylenically unsaturated hydrocarbon, and salt of aluminum, magnesium or scandium.

DESCRIPTION OF THE INVENTION

The polymers which are stabilized according to the invention are linear alternating polymers of carbon monoxide and at least one ethylenically unsaturated hydrocarbon. The ethylenically unsaturated hydrocarbons which are useful as the precursors of the linear alternating polymers have up to 20 carbon atoms inclusive, preferably up to 10 carbon atoms inclusive, and are aliphatic such as ethylene and other α-olefins including propylene, 1-butene, isobutylene, 1-hexene, 1-octene and 1-docecene, or are arylaliphatic having an aryl substituent on an otherwise aliphatic molecule, particularly an aryl substituent on a carbon atom of the ethylenic unsaturation. Illustrative of this latter class of ethylenically unsaturated hydrocarbons are styrene, p-methylstyrene, p-ethylstyrene and m-propylstyrene. The preferred polyketone polymers are copolymers of carbon monoxide and ethylene or terpolymers of carbon monoxide, ethylene and a second ethylenically unsaturated hydrocarbon of at least 3 carbon atoms, particularly an α-olefin such as propylene.

When the preferred terpolymers are employed in the compositions of the invention, there will be at least about 2 units incorporating a moiety of ethylene for each unit incorporating a moiety of the second hydrocarbon. Preferably, there will be from about 10 units to about 100 units incorporating a moiety of the second hydrocarbon. The polymer chain of the preferred polymers is therefore represented by the repeating formula

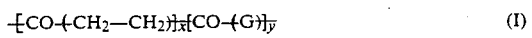

$$-[CO-(CH_2-CH_2)]_x-[CO-(G)]_y- \quad (I)$$

wherein G is the moiety of the second ethylenically unsaturated hydrocarbon of at least 3 carbon atoms polymerized through the ethylenic unsaturation thereof, and the ratio of y:x is no more than about 0.5. When copolymers of carbon monoxide and ethylene are employed there will be no second hydrocarbon present and the copolymers are represented by the above formula I wherein y is zero. When y is other than zero, i.e., terpolymers are to be utilized, the $-CO-(CH_2CH_2)-$ units and the $-CO-(G)-$ units occur randomly throughout the polymer chain and preferred ratios of y:x are from about 0.01 to about 0.1. The end groups or "caps" of the polymer chain will depend upon what materials were present during the production of the polymer and how or whether the polymer has been purified. The end groups of the polymer are of little significance so far as the overall properties of the polymer are concerned so that the polymer is fairly represented by the polymer chain as depicted above.

Of particular interest are the polymers of the above formula I having a number average molecular weight of from about 1000 to about 200,000, especially those polymers of number average molecular weight from about 20,000 to about 90,000, as determined by gel permeation chromatography. The physical properties of the polymers are determined in part by the molecular weight, whether the polymer is a copolymer or a terpolymer and, in the case of terpolymers, the nature of and the proportion of the second hydrocarbon present. Typical melting points for such polymers are from about 175° C. to about 300° C., more often from about 210° C. to about 270° C. The polymers will have a limiting viscosity number (LVN), measured in a standard capillary viscosity measuring device in m-cresol at 60° C., of from about 0.4 dl/g to about 10 dl/g, preferably from about 0.8 dl/g to about 4 dl/g.

The polymers are produced by general methods of the above published European Patent Applications. Although the scope of the polymerization is extensive, a preferred catalyst composition is formed from a palladium salt, particularly a palladium alkanoate such as palladium acetate, the anion of trifluoroacetic acid or p-toluenesulfonic acid, and a bidentate ligand of phosphorus such as 1,3-bis(diphenylphosphino)propane or 1,3-bis[di(2-methoxyphenyl)phosphino]propane. The reactants are typically contacted in the presence of the catalyst composition under polymerization conditions in an inert reaction diluent. Suitable reaction diluents include alkanols such as methanol and ethanol. Methanol is preferred. Typical polymerization conditions include a reaction temperature of from about 20° C. to about 150° C., preferably from about 30° C. to about 135° C. The suitable reaction pressures are from about 10 atmospheres to about 200 atmospheres but reaction pressures from about 20 atmospheres to about 100 atmospheres are preferred. When polymerization has taken place, the reaction is terminated as by cooling the reaction mixture and releasing the releasing the pressure. The polymer product is generally obtained as a material substantially insoluble in the reaction diluent and is recovered by conventional procedures such as filtration or decantation. The polymer product is used as recovered or is purified as by treatment with a solvent or extraction agent which is selective for catalyst residues.

The second component of the compositions of the invention is a partial zinc salt of an acidic polymer containing moieties of an α-olefin and an α,β-ethylenically unsaturated carboxylic acid. By the term partial zinc salt is meant that some but not all of the carboxylic acid moieties have been neutralized with zinc as discussed below. Because the partially neutralized material retains ionic character while being polymeric in form, the partial zinc salt is often referred to as a zinc ionomer.

The α-olefin component of the partially neutralized polymer is an α-olefin of up to 10 carbon atoms inclusive such as ethylene, propylene, 1-butene, isobutylene, 1-hexene, 1-octene and 1-decene. Preferred α-olefins are straight-chain α-olefins of up to 4 carbon atoms inclusive and particularly preferred is ethylene. The α-olefin component of the partially neutralized acidic polymer is present in at least about 80% by mol, based on total base or non-neutralized polymer and is preferably present in a quantity of at least about 90% by mol on the same basis.

The unsaturated carboxylic acid component of the partially neutralized polymer is an α,β-ethylenically unsaturated carboxylic acid of up to 10 carbon atoms inclusive and is illustrated by acrylic acid, methacrylic acid, 2-hexenoic acid, 2-octenoic acid and 2-decenoic acid. The preferred α,β-ethylenically unsaturated carboxylic acids have up to 4 carbon atoms inclusive. These are acrylic acid, methacrylic acid and crotonic acid, of which acrylic acid and methacrylic acid are preferred. The unsaturated carboxylic acid content of the partially neutralized acidic polymer is from about 1% by mole to about 25% by mole based on the base or non-neutralized polymer. Amounts of carboxylic acid from about 9% by mol to about 15% by mol on the same basis are preferred.

The partially neutralized polymer is suitably a copolymer of the α-olefin and the α,β-unsaturated carboxylic acid and in general such copolymers are preferred. On occasion, however, it is useful to include as an optional third component a third monomer which is a non-acidic, low molecular weight polymerizable monomer of up to 8 carbon atoms inclusive. Such optional third monomer of the acidic polymer is suitably a second α-olefin such as propylene or styrene when the principal α-olefin is ethylene, an unsaturated ester such as vinyl acetate, methyl methacrylate or butyl acrylate, an unsaturated halohydrocarbon such as vinyl fluoride, or an unsaturated nitrile such as acrylonitrile. As previously stated, the presence of a third monomer within the acidic polymer is optional and not required. When a third component is present, however, amounts of the third monomer up to about 5% by mol, based on base polymer, are satisfactory with amounts up to about 3% by mol on the same basis being preferred.

The partially zinc-neutralized acidic polymer is produced by reacting the α-olefin/unsaturated carboxylic acid/optional third monomer polymer with a source of an ionizable zinc compound sufficient to neutralize from about 5% to about 80% of the carboxylic acid groups present in the acidic polymer. Such neutralization with ionizable zinc results in uniform distribution of zinc metal throughout the polymer. Neutralization of from about 10% to about 75% of the carboxylic acid groups is preferred. The zinc ions suitably employed in the partial neutralization are uncomplexed zinc ions which are provided in compounds of the type often referred to as zinc salts, e.g., zinc acetate, zinc chloride and zinc formate. The zinc is also suitably provided in the form of complexed zinc ions wherein the zinc is bonded to one type of anion which is readily ionized from the metal and a second type of anion which is not readily ionized from the metal. Illustrative of a source of the complexed zinc ions are mixed zinc salts with one weak acid such as oleic acid or stearic acid and one more ionizable acid such as acetic acid or formic acid. In general, partial neutralization of the acidic polymer with complexed zinc ions is most preferred. The partially zinc-neutralized ionomers are known materials and methods for the production of the zinc ionomers are also well known. Certain of these zinc ionomers are commercially available being marketed under the trademark SURLYN® by DuPont.

The partially zinc-neutralized acidic polymer is provided to the compositions of the invention in a minor quantity. Amounts of the zinc ionomer from about 0.05% by weight to about 5% by weight, based on the total composition are satisfactory. Quantities of zinc ionomer from about 0.1% by weight to about 3% by weight on the same basis are preferred.

The third component of the compositions of the invention is an organic acid salt of aluminum, magnesium or scandium. Although a variety of salts of these metals are satisfactory, the preferred metal salts are carboxylates. Salts of aromatic carboxylic acids such as benzoic acid, naphthalenecarboxylic acid and p-methylbenzoic acid are useful as components of the compositions of the invention but the preferred salts are salts of alkanoic acids of up to 10 carbon atoms inclusive such as acetic acid, propionic acid, hexanoic acid or octanoic acid. The acetates of aluminum, magnesium or scandium are a preferred class of metal salts. The salts are completely neutralized salts, i.e., salts in which each valence of the aluminum, magnesium or scandium is combined with a carboxylate anion, or are basic salts in which at least one hydroxyl group is associated with the metal. Illustrative of metal salts useful in the compositions of the invention are magnesium acetate, magnesium propionate, magnesium benzoate, aluminum acetate, basic aluminum acetate, dibasic aluminum acetate, aluminum octanoate, scandium acetate and scandium hexanoate. In the case of salts of magnesium and scandium the completely neutralized salts are preferred whereas in the case of aluminum the basic aluminum carboxylates give better results.

The amount of metal salt to be employed as the third component is not critical but the metal salt is typically employed in a molar amount at least equal to the zinc content of the partially zinc-neutralized acidic polymer. Molar ratios of metal carboxylate to zinc from about 1:1 to about 10:1 are satisfactory although ratios from about 2:1 to about 5:1 are preferred.

The method of producing the compositions of the invention from the polyketone polymer, the partially zinc-neutralized acidic polymer and the metal salt is not critical as long as an intimate mixture is obtained. In one modification, the components in a finely divided form are dry-blended and co-melted. In an alternate modification a mixture of the components is passed through an extruder to produce the intimate mixture as an extrudate. In yet another modification the composition is produced in a mixing device or blender operating at a high shear. The compositions may also contain other additives such as colorants, plasticizers, fibers, reinforcements and mold release agents which are added to the polyketone polymer together with or separately from the other components of the composition.

The compositions of the invention will have an improved melt stability as evidenced by a relatively constant apparent crystallinity when subjected to melt processing operations of melting and solidification. This improvement in retained apparent crystallinity offers considerable advantages which are not to be found when unstabilized polymers are utilized. For example, in a typical processing scheme, the stabilized composition is converted into nibs by passage through an extruder. The nibs are then often injection molded to produce a shaped article. Each of these operations involves a melting/solidification cycle which is accomplished without substantial decrease in crystallinity as determined by a relatively constant melting point or other related physical property. The compositions of the invention are therefore particularly useful in applications involving a series of melting and solidification cycles. While the compositions of the invention are processed into useful articles by conventional techniques which do not involve melting and solidification of the polymer, the advantages of the compositions of the invention are most apparent when melt processing operations which do involve the melting and solidification of the polyketone polymer are employed.

Thus, the compositions are useful as premium thermoplastics as is known in the art for the polyketone polymer. The compositions are particularly useful in the production of shaped articles by a series of melting and solidification cycles, which articles are likely to be subjected to conditions requiring a relatively high degree of crystallinity. Illustrative of such articles are containers for food and drink and parts and housings for automotive applications.

The invention is further illustrated by the following Comparative Example (not of the invention) and the Illustrative Embodiments which should not be regarded as limiting the invention.

ILLUSTRATIVE EMBODIMENT I

A terpolymer of carbon monoxide, ethylene and propylene was produced in the presence of a catalyst composition formed from palladium acetate, trifluoroacetic acid and 1,3-bis[di(2-methoxyphenyl)phosphino]-propane. The terpolymer had a melting point of 218° C. and a limiting viscosity number (LVN), measured in m-cresol at 60° C., of 1.84 dl/g.

ILLUSTRATIVE EMBODIMENT II

Compositions were produced by dry mixing the terpolymer of Illustrative Embodiment I and 0.3% by weight, based on total composition [?] of a mixture of a partially neutralized zinc salt of a copolymer of ethylene and methacrylic acid and a sufficient amount of various metal salts to provide a molar ratio of metal to zinc of 3:1. The partially neutralized polymer contained 9% of methacrylic acid and was 18% neutralized with zinc. The components were tumbled overnight and extruded in a Bolser Perlsires extruder operating at 275° C. in air. Compositions produced in this manner and the metal salt each contains are described in Table I.

TABLE I

| Composition | Metal Salt Component |
|---|---|
| A | $AlOH(O_2CCH_3)_2$ |
| B | $Mg(O_2CCH_3)_2$ |
| C | $Mg(O_2CC_2H_5)_2$ |
| D | $Mg(O_2CC_6H_5)_2$ |
| E | $Sc(O_2CCH_3)_3$ |

ILLUSTRATIVE EMBODIMENT III

In this Illustrative Embodiment, measurements of melting points and crystallization temperatures, or alternatively heats of melting and heats of fusion, were made by the use of a Perkin-Elmer DSC 7 differential scanning calorimeter (DSC) which employs samples of polymer or composition in sealed pan containers. The pan and contents are heated at a controlled rate, typically 20° C./minute, until reaching the temperature at which the sample has melted, $T_m1$. The pan and contents are then cooled to the temperature at which the sample has solidified, $T_c1$, is reached and then heated past a second melting point, $T_m2$, to 285° C. at which temperature the sample is maintained for 10 minutes. The pan and contents are then cooled until the sample has again solidified, $T_c2$. The melting and crystallization temperatures are defined as the temperatures at which the heat flow reaches a maximum (for melting) or a minimum (for crystallization). Typically, the melting point $T_m$ will be higher than the crystallization temperature and each will decrease somewhat with repeated melting/solidification cycles. Although a number of factors influence the melting point and crystallization temperatures, these values are influenced by the crystallinity of the polymer. In general, the smaller the difference between the first and second melting points, or the first and second crystallization temperatures, the greater the degree of retained apparent crystallinity.

It is also possible through the use of the DSC to determine the magnitude of the first and second heats of melting ($H_1$ and $H_2$) in cal/g and the first and second heats of crystallization ($C_1$ and $C_2$), also in cal/g, for the polymer and compositions. In general, the heats of crystallization will be higher for the stabilized compositions than for the unstabilized polymer. The higher the ratio $C_2/C_1$ is or $H_2/H_1$ is, the higher the retained apparent crystallinity.

The compositions of Illustrative Embodiment II, as well as the terpolymer of Illustrative Embodiment I and the terpolymer plus partially zinc-neutralized acidic polymer (PZNP) were evaluated by the above DSC procedure. The results are shown in Table II.

TABLE II

| Sample | $T_c2$ | $C_2/C_1$ | $H_2/H_1$ |
|---|---|---|---|
| Terpolymer | 164.1 | 0.83 | 0.95 |
| Terpolymer + PZNP | 167.1 | 0.88 | 1.04 |
| Composition A | 166.9 | 0.88 | 1.10 |
| Composition B | 157.9 | 0.65 | 1.01 |
| Composition C | 167.9 | 0.89 | 1.13 |
| Composition D | 167.3 | 0.93 | 1.08 |
| Composition E | 165.2 | 0.88 | 1.04 |

COMPARATIVE EXAMPLE

By the procedure of Illustrative Embodiment II compositions were produced employing metal salts not of the invention. The compositions produced are shown in Table III.

TABLE III

| Composition | Metal Salt Component |
|---|---|
| X | $Zn(O_2CC_2H_5)_4$ |
| Y | $Si(O_2CCH_3)_4$ |
| Z | $Ba(O_2CCH_3)_2$ |

These compositions were evaluated by the procedure of Illustrative Embodiment III. The results are shown in Table IV.

TABLE IV

| Sample | $T_c2$ | $C_2/C_1$ | $H_2/H_1$ |
|---|---|---|---|
| Terpolymer | 164.1 | 0.83 | 0.95 |
| Terpolymer + PZNP | 167.1 | 0.88 | 1.04 |
| Composition X | 158.2 | 0.82 | 1.11 |
| Composition Y | 162.5 | 0.84 | 1.07 |
| Composition Z | 159.8 | 0.81 | 0.91 |

What is claimed is:

1. A stabilized composition comprising a linear alternating polymer of carbon monoxide and at least one ethylenically unsaturated hydrocarbon, a partially zinc-neutralized acidic polymer containing moieties of an α-olefin and an α,β-ethylenically unsaturated carboxylic acid and salt of aluminum, magnesium or scandium.

2. The composition of claim 1 wherein the linear alternating polymer is represented by the repeating formula

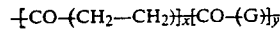

wherein G is the moiety of an ethylenically unsaturated hydrocarbon of at least 3 carbon atoms polymerized through the ethylenic unsaturation thereof and the ratio of y:x is no more than about 0.5.

3. The composition of claim 2 wherein the acidic polymer is a copolymer of ethylene and methacrylic acid or acrylic acid.

4. The composition of claim 3 wherein the metal salt of aluminum, magnesium or scandium is a carboxylate.

5. The composition of claim 4 wherein the partially neutralized acidic polymer contains at least 80% by mol ethylene and is neutralized from about 5% to about 80% with zinc.

6. The composition of claim 5 wherein the partially neutralized acidic polymer is present in an amount from about 0.05% by weight to about 5% by weight based on total composition.

7. The composition of claim 6 wherein the metal carboxylate is present in a quantity sufficient to provide a molar ratio of metal:zinc of from about 1:1 to about 10:1.

8. The composition of claim 6 wherein y is zero.

9. The composition of claim 8 wherein the metal carboxylate is a metal alkanoate.

10. The composition of claim 6 wherein G is a moiety of propylene and the ratio of y:x is from about 0.01 to about 0.1.

11. The composition of claim 10 wherein the metal carboxylate is a metal alkanoate.

12. The composition of claim 11 wherein the metal is aluminum.

13. The composition of claim 11 wherein the metal is magnesium.

14. The composition of claim 11 wherein the metal is scandium.

15. The composition of claim 11 wherein the metal alkanoate is scandium acetate.

16. The composition of claim 11 wherein the metal alkanoate is magnesium propionate.

17. The composition of claim 10 wherein the metal carboxylate is magnesium benzoate.

* * * * *